Patented Jan. 19, 1937

2,068,630

UNITED STATES PATENT OFFICE 2,068,630

MANUFACTURE OF TRANSPARENT FILMS

George A. Richter, Berlin, N. H., assignor to Brown Company, Berlin, N. H., a corporation of Maine No Drawing. Application May 2, 1934, Serial No. 723,507

11 Claims. (Cl. 106—40)

This invention relates to the manufacture of transparent films or pellicles more particularly of the kind that are derived from aqueous solutions of cellulose derivatives such as cellulose xanthate, cuprammonium cellulose, hydroxy cellulose ethers, or the like.

I have found that films prepared from solutions of the foregoing character may be vastly improved in their tear resistance by the admixture therewith of a comparatively small amount of a mechanically gelatinized or well-hydrated cellulose pulp. Aside from the fact that mechanically gelatinized cellulose pulp is comparatively inexpensive and hence does not increase raw material costs, when used in accordance with my invention it does not impair chemically or otherwise the aqueous solution of the cellulose derivative for transformation into film form, does not interfere with the steps heretofore employed in effecting such transformation, and does not detract appreciably from the transparency and other desired qualities heretofore realized in the films.

In preparing the mechanically gelatinized cellulose pulp, it is well to choose the kind of pulp that is easily gelatinized or hydrated as in the ordinary stone-roll beater. Chemically preliberated pulps of high pentosan content fall into this category, for instance, the strong wood pulps of high pentosan content that are produced by under-cooking wood chips in acid sulphite liquors or by cooking them in neutral or alkaline sulphite liquors. After the pulp has been mechanically gelatinized, it may be thickened to a stage where it does not cause undesirable dilution of the aqueous solution of the cellulose derivative to which it is added. The mechanically gelatinized cellulose may be readily mixed with and dispersed into such solution in an ordinary mixing tank in the proportion of about 2% to 5%, based on the cellulose content of the solution; and, in some instances, a larger amount of mechanically gelatinized cellulose may be advantageously used, say, 5% to 10%, based on the cellulose content of the solution.

The solution containing the mechanically gelatinized cellulose uniformly dispersed therein can be transformed into films or pellicles by casting in the usual ways in an aqueous setting bath whose chemical composition depends upon the particular solution which is to be set. In the case of a solution of such derivatives as cellulose xanthate and cuprammonium cellulose, cellulose is regenerated from the derivative in the form of a film from which the other decomposition products are removed as far as is practically possible by suitable chemical after-treatments. In the case of the solution of a hydroxy cellulose ether, such as the hydroxy ethyl ether, the ether as such is precipitated in the form of a film and, other than washing, the film needs no after-treatment.

I shall now give a specific example of procedure involving the use of an aqueous solution of cellulose xanthate or so-called viscose syrup in making transparent films or pellicles in accordance with my invention. An under-cooked but bleached sulphite pulp is put into a stone-roll beater with sufficient water to produce a stock of, say, about 5% consistency and the stock is beaten for about four hours. The stock is well gelled at the end of this time. Were it sheeted on a paper-making machine and the paper calendered, the resulting sheet of paper would be of the so-called glassine variety. The mechanically gelatinized cellulose is preferably thickened as on a cylinder machine to a consistency of about 20%, which consistency can be attained without the use of press rolls. The wet, thickened stock is then mixed with a suitable cellulose xanthate solution in the amount of about 5%, based on cellulose existing in the form of xanthate. More specifically, the xanthate solution is preferably one that contains about 6½% caustic soda and about 7% cellulose in the form of xanthate and has a fluidity at room temperature comparable to that of honey. The cellulose xanthate solution may, if desired, be a fully ripened one, although it is generally preferable to use an unripened or a partially ripened xanthate solution for casting into film form. The slight dilution of the xanthate solution effected by the addition thereto of the wet, mechanically gelatinized cellulose in the amount mentioned is of no practical consequence. The mechanically gelatinized cellulose is intimately mixed with the xanthate solution and the mixture is preferably subjected to vacuum to ensure the removal therefrom of entrained air bubbles. The mixture, although viscous, is sufficiently fluent to undergo casting into a film either by extrusion through a nozzle into the setting bath or by deposition as a uniform coating onto the surface of a suitable carrier that moves progressively into and out of the setting bath. Thus, the mixture may be deposited on the periphery of a cylinder that slowly rotates partially submerged in the setting bath and that carries the thin layer or film into and out of the bath. The thickness and uniformity of the layer deposited on the cylinder periphery may be controlled as by an adjustable doctor blade. The setting bath may consist of an aqueous solution of ammonium sulphate of about 20% to 30% strength which serves to set or congeal the liquid mixture without, however, causing regeneration of the cellulose from the xanthate to a considerable extent. The set film is sufficiently strong to be stripped from the cylinder and led progressively to a second setting bath comprising a weak mineral acid solution, for instance, a 2% hydrochloric acid solution at room temperature. The second setting bath serves to regenerate the cellulose fully from the xanthate. The film is then progressively washed, led through a desulphurizing bath, again washed, led through a bleaching bath, again washed, preferably glycerinated, dried, and finally accumulated as in roll form. Desulphurization may be accomplished as in a 1% solution of sodium sulphide at about 80° C. Bleaching may be done as in a 5% solution of sodium hypochlorite. Glycerination may take place in an aqueous glycerine solution containing, say, about 5% to 10% glycerine.

Whereas a film or pellicle of regenerated cellulose lacking mechanically gelatinized cellulose is of extremely low tear resistance, being practically lacking in resistance to tear when tearing is once initiated, a film or pellicle of regenerated cellulose and mechanically gelatinized cellulose prepared in accordance with my invention has significant tear resistance, approaching that of so-called glassine papers. The film or pellicle of the present invention has a decided advantage over glassine paper in that it is of a transparency inappreciably different from that of the ordinary film or pellicle of regenerated cellulose, as the mechanically gelatinized cellulose fibers or fiber fragments are in themselves translucent when dried as a thin layer and, being used in comparatively small proportion, do not detract observably from the transparency realized in a film of regenerated cellulose alone.

Inasmuch as there is no generic term of which I am aware that covers a cast, substantially transparent film wherein cellulose exists either in regenerated form and/or in the form of cellulose derivatives and inasmuch as both of these forms are contemplated by my invention, I shall use the expression "cellulose base film" in the appended claims for the purpose of covering both these forms.

I claim:—

1. A cast, substantially transparent, cellulose base film containing distributed therethrough a minor proportion of mechanically gelatinized cellulose pulp of the glassine-paper-forming variety that does not detract appreciably from the transparency of such film while appreciably increasing the tear resistance of such film.

2. A cast, substantially transparent, cellulose base film containing distributed therethrough about 2% to 10% by weight of mechanically gelatinized cellulose pulp of the glassine-paper-forming variety that does not detract appreciably from the transparency of such film while appreciably increasing the tear resistance of such film.

3. A cast, substantially transparent film of regenerated cellulose containing distributed therethrough a minor proportion of mechanically gelatinized cellulose pulp of the glassine-paper-forming variety that does not detract appreciably from the transparency of such film while appreciably increasing the tear resistance of such film.

4. A cast, substantially transparent film of regenerated cellulose containing distributed therethrough about 2% to 10% by weight of mechanically gelatinized cellulose pulp of the glassine-paper-forming variety that does not detract appreciably from the transparency of such film while appreciably increasing the tear resistance of such film.

5. A cast, substantially transparent film of hydroxy cellulose ether containing distributed therethrough a minor proportion of mechanically gelatinized cellulose pulp of the glassine-paper-forming variety that does not detract appreciably from the transparency of such film while appreciably increasing the tear resistance of such film.

6. A cast, substantially transparent film of hydroxy cellulose ether containing distributed therethrough about 2% to 10% by weight of mechanically gelatinized cellulose pulp of the glassine-paper-forming variety that does not detract appreciably from the transparency of such film while appreciably increasing the tear resistance of such film.

7. In the production of transparent cellulose base film from an aqueous solution of a cellulose derivative by a practice that involves casting the solution into an aqueous bath of setting chemicals, those steps which comprise beating cellulose pulp in water until it has been gelatinized sufficiently to be of the glassine-paper-forming variety, and dispersing such gelatinized pulp while wet into the cellulose derivative solution prior to its casting in such minor amount, based on the cellulose content of said cellulose derivative solution, that it does not impair the casting properties of such solution and does not detract appreciably from the transparency of the film cast therefrom.

8. In the production of transparent cellulose base film from an aqueous solution of a cellulose derivative by a practice that involves casting the solution into an aqueous bath of setting chemicals, those steps which comprise beating cellulose pulp in water until it has been gelatinized sufficiently to be of the glassine-paper-forming variety, and dispersing such gelatinized pulp in a thickened but wet condition into the cellulose derivative solution prior to its casting in such minor amount, based on the cellulose content of said cellulose derivative solution, that it does not impair the casting properties of such solution and does not detract appreciably from the transparency of the film cast therefrom.

9. In the production of transparent cellulose base film from an aqueous solution of a cellulose derivative by a practice that involves casting the solution into an aqueous bath of setting chemicals, those steps which comprise beating cellulose pulp in water at a consistency of about 5% until it has been gelatinized sufficiently to be of the glassine-paper-forming variety, thickening the resulting gelatinized pulp to a consistency of at least about 20%, and dispersing such pulp in a thickened but wet condition into the cellulose derivative solution prior to its casting in such minor amount, based on the cellulose content of said cellular derivative solution, that it does not impair the casting properties of such solution and does not detract appreciably from the transparency of the film cast therefrom.

10. In the production of a transparent film of regenerated cellulose from an aqueous solution of cellulose xanthate that involves casting the solution into an aqueous bath of setting chemicals, that step which comprises adding to the xanthate solution prior to its casting wet, mechanically gelatinized cellulose pulp of the glassine-paper-forming variety in such minor amount, based on the cellulose content of said cellulose derivative solution, that it does not impair the casting properties of such solution and does not detract appreciably from the transparency of the film cast therefrom.

11. In the production of a transparent film of regenerated cellulose from an aqueous solution of cellulose xanthate that involves casting the solution into an aqueous bath of setting chemicals, that step which comprises adding to the xanthate solution prior to its casting about 2% to 10% of wet, mechanically gelatinized cellulose pulp of the glassine-paper-forming variety, based upon the cellulose existing as xanthate in the solution, such pulp being of a consistency such that the solution undergoes little dilution and is otherwise substantially unimpaired for casting into a substantially transparent film.

GEORGE A. RICHTER.